(12) United States Patent
Hanmura et al.

(10) Patent No.: US 7,598,301 B2
(45) Date of Patent: Oct. 6, 2009

(54) WATER BASED INK

(75) Inventors: Masahiro Hanmura, Kanagawa-Ken (JP); Miharu Kanaya, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 11/394,341

(22) Filed: Mar. 30, 2006

(65) Prior Publication Data

US 2006/0270756 A1    Nov. 30, 2006

(30) Foreign Application Priority Data

Mar. 31, 2005  (JP) .............................. 2005-102605
Aug. 19, 2005  (JP) .............................. 2005-238960
Mar. 29, 2006  (JP) .............................. 2006-091827

(51) Int. Cl.
   *C09D 11/00*   (2006.01)

(52) U.S. Cl. ................... 523/160; 523/161; 106/31.28; 106/31.6; 524/556; 524/577; 524/612

(58) Field of Classification Search ............. 106/31.13, 106/218; 523/160; 524/366; 347/1, 54, 347/56, 68, 73, 100, 112
See application file for complete search history.

(56) References Cited

U.S. PATENT DOCUMENTS

| | | | |
|---|---|---|---|
| 6,087,416 A | * | 7/2000 | Pearlstine et al. ............ 523/160 |
| 7,189,767 B2 | * | 3/2007 | Gore et al. ................... 523/160 |
| 7,244,774 B2 | * | 7/2007 | Tanaka et al. ................ 523/160 |
| 7,345,098 B2 | * | 3/2008 | Mizushima et al. ......... 523/160 |

FOREIGN PATENT DOCUMENTS

| JP | 2004-2662 | 1/2001 |
|---|---|---|
| JP | 2001-329199 | 11/2001 |
| JP | 2004-75988 | 3/2004 |

OTHER PUBLICATIONS

Computer-Generated English Translation and Patent Abstracts of Japan of JP 2004-75988 dated Mar. 11, 2004.
Computer-Generated English Translation and Patent Abstracts of Japan of JP 2004-2662 dated Jan. 8, 2004.
Computer-Generated English Translation and Patent Abstracts of Japan of JP 2001-329199 dated Nov. 11, 2001.

* cited by examiner

*Primary Examiner*—David Wu
*Assistant Examiner*—Vu Nguyen
(74) *Attorney, Agent, or Firm*—Ladas and Parry LLP

(57) ABSTRACT

There is provided a water-based ink that can exhibit high gloss on gloss paper and has excellent fixation while maintaining ink reliability such as recovery from clogging, continuous printing stability, and ink storage stability. The water-based ink comprises at least yellow pigment-containing polymer particles A and pigment-free polymer particles B. The polymer particles A are formed of a water insoluble vinyl polymer produced by polymerizing a specific monomer composition A, and the polymer particles B are formed of a water insoluble vinyl polymer produced by polymerizing a specific monomer composition B and has a minimum film forming temperature of 20° C. or above. The polymer particles B have an average particle diameter of 30 to 60 nm.

9 Claims, No Drawings

WATER BASED INK

BACKGROUND OF THE INVENTION

1. Field of the Invention

The present invention relates to a water-based ink that is suitable for use in ink jet recording and other methods and can exhibit high gloss on gloss paper and has excellent fixation while maintaining ink reliability such as recovery from clogging, continuous printing stability, and ink storage stability.

2. Background Art

Ink jet recording is a method wherein ink is ejected as droplets through fine nozzle heads to record letters or figures onto the surface of recording media such as paper. Ink jet recording systems which have been developed and put to practical use include a method wherein an electric signal is converted to a mechanical signal using an electrostrictive element to intermittently eject droplets of ink reservoired in a nozzle head section, thereby recording letters or symbols on the surface of a recording medium, and a method wherein ink, reservoired in a nozzle head section, in its portion very close to the ejection portion is rapidly heated to create a bubble and droplets of the ink are intermittently ejected by volume expansion created by the bubble to record letters or symbols on the surface of a recording medium.

Water-based inks comprising a colorant of a dye or a pigment dispersed in water have been proposed as the ink for ink jet recording. In such water-based inks, it is common practice to disperse the colorant in an aqueous dispersant with the aid of a dispersant such as a surfactant or a polymeric dispersant. Various proposals have been made for compositions of such inks. For example, Japanese Patent Laid-Open Nos. 2662/2004 and 75988/2004 propose water-based inks containing a specific vinyl polymer. The claimed advantages of the proposed water-based inks are excellent waterfastenss, lightfastness, rubbing/scratch resistance, and dispersion stability.

Further, Japanese Patent Laid-Open No. 329199/2001 proposes a water-based ink composition for further improving rubbing/scratch resistance. The water-based ink composition comprises polymer particles A comprising a pigment incorporated in a water-insoluble polymer, and polymer particles B.

Printing of the above conventional water-based inks on recording media such as gloss paper, however, sometimes suffer from a problem that, when the resultant recorded matter is placed in or taken out of a clear file and the like, the surface of the recorded matter undergoes a change due to friction with the clear file, or a problem that, when recorded matters are put on top of each other, friction between the surface of the recorded matter and the backside of the recorded matter occurs, leading to a change in surface state.

SUMMARY OF THE INVENTION

The present inventors have found that the use of specific polymer fine particles containing a yellow pigment and specific polymer fine particles not containing any pigment can realize a water-based ink that can exhibit high gloss on gloss paper and has excellent fixation while maintaining ink reliability such as recovery from clogging, continuous printing stability, and ink storage stability. The present invention has been made based on such finding.

Accordingly, an object of the present invention is to provide a water-based ink that has high gloss on gloss paper and has excellent fixation while maintaining ink reliability such as recovery from clogging, continuous printing stability, and ink storage stability.

According to the present invention, there is provided a water-based ink comprising a water dispersion of polymer particles including at least polymer particles A of a yellow pigment-containing water insoluble vinyl polymer A and polymer particles B of a pigment-free water insoluble vinyl polymer B, wherein the water insoluble vinyl polymer A is a polymer produced by polymerizing a monomer composition A containing

[1] a polyoxyalkylene group-containing monomer,

[2] a salt forming group-containing monomer, and

[3] a monomer copolymerizable with the polyoxyalkylene group-containing monomer and the salt forming group-containing monomer, the water insoluble vinyl polymer B is a polymer produced by polymerizing a monomer composition B containing

[4] a styrene monomer and

[5] a monomer copolymerizable with the styrene monomer, and has a minimum film forming temperature of 20° C. or above, and the polymer particles B have an average particle diameter of 30 to 60 nm.

The present invention can realize a water-based ink that can exhibit high gloss on gloss paper and has excellent fixation while maintaining ink reliability such as recovery from clogging, continuous printing stability, and ink storage stability.

DETAILED DESCRIPTION OF THE INVENTION

The water-based ink according to the present invention comprises polymer particles A of a yellow pigment-containing water insoluble vinyl polymer A and polymer particles B of a pigment-free water insoluble vinyl polymer.

The resin constituting polymer particles A comprises a water insoluble vinyl polymer. The water insoluble vinyl polymer is a polymer produced by copolymerizing a monomer composition A comprising [1] a polyoxyalkylene group-containing monomer, [2] a salt forming group-containing monomer, and [3] a monomer copolymerizable with the polyoxyalkylene group-containing monomer and the salt forming group-containing monomer.

The weight average molecular weight of the water insoluble vinyl polymer constituting the polymer particles A is preferably 30,000 to 200,000.

Monomer Composition A

The monomer composition A for constituting the water insoluble vinyl polymer constituting the polymer particles A comprises [1] a polyoxyalkylene group-containing monomer, [2] a salt forming group-containing monomer, and [3] a monomer copolymerizable with the polyoxyalkylene group-containing monomer and the salt forming group-containing monomer.

[1] Polyoxyalkylene Group-Containing Monomer

The polyoxyalkylene group-containing monomer is used as one of starting materials for the synthesis of the vinyl polymer, and monomers containing a polyoxyethylene, polyoxypropylene group or the like may be used as the polyoxyalkylene group-containing monomer. Among them, one or more monomers selected from the group consisting of monomer A1, monomer A2, monomer A3, and monomer A4 represented by formulae (I) to (IV) are preferably contained in the polyoxyalkylene group-containing monomer.

Monomer A1:

wherein $R^1$ represents a hydrogen atom or a methyl group; $R^2$ represents a hydrogen atom, an alkyl group having 1 to 20 carbon atoms or an alkylphenyl group having 1 to 9 carbon atoms; and m is a number of 1 to 30.

Monomer A2:

wherein $R^1$ and $R^2$ are as defined in formula 1; and n is a number of 1 to 30.

Monomer A3:

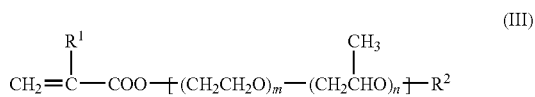

(III)

wherein $R^1$, $R^2$, m and n are as defined in formula 1; and the oxyethylene groups and the oxypropylene groups within [ ] may be added to each other as blocks or randomly regardless of order.

Monomer A4:

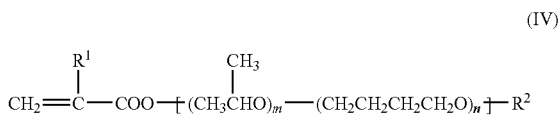

(IV)

wherein $R^1$, $R^2$, m and n are as defined in formula 1; and the oxypropylene groups and the oxytetramethylene groups within [ ] may be added to each other as blocks or randomly regardless of order.

In formulae (I) to (IV), $R^2$ represents a hydrogen atom, an alkyl group having 1 to 20 carbon atoms or an alkylphenyl group having 1 to 9 carbon atoms. Among them, an octyl group and a nonyl phenyl group are preferred from the viewpoints of water resistance and rubbing/scratch resistance.

m is a number of 1 to 30, and, from the viewpoint of ejection stability and print density, m is preferably 2 to 25.

n is a number of 1 to 30, and, from the viewpoint of ejection stability and print density, n is preferably 2 to 25.

In monomer A3, the oxyethylene groups and the oxypropylene groups are added to each other as blocks or randomly.

In monomer A4, the oxypropylene groups and the oxytetramethylene groups are added to each other as blocks or randomly.

When monomer A1 is used for the water insoluble vinyl polymer constituting polymer particles A, a water-based ink can be provided which is further improved in gloss of printed images, ink storage stability, and recovery from clogging. The reason for this has not been elucidated yet but is believed to reside in that a hydrophilic hydrate layer of a highly hydrophilic oxyethylene group possessed by monomer A1 is spread in the water-based ink.

A water-based ink having excellent ejection stability can be provided by using monomer A2 in the water insoluble vinyl polymer constituting polymer particles A. The reason for this has not been elucidated yet but is believed to be as follows. Strong hydrophobic interaction occurs between the highly hydrophobic oxypropylene group in monomer A2 and the colorant (yellow pigment). Therefore, the vinyl polymer develops strong adsorptivity to the colorant, and, hence, the hydrophobicity of the polymer particles containing the colorant is increased. As a result, it is considered that the viscosity of the water-based ink is lowered and the ejection stability is improved.

When monomer A3 or monomer A4 is used in the water insoluble vinyl polymer, the dispersion stability of the colorant is further improved. The reason for this has not been elucidated yet but is believed to reside in that a hydrophilic hydrate layer of a highly hydrophilic oxyethylene or oxytetramethylene group is spread in the ink.

Polyethylene glycol mono(meth)acrylate and the like may be mentioned as monomer A1. Specific examples of monomer A1 as commercially available monomer A1 include: NK Ester M-20G, NK Ester M-40G, NK Ester M-90G, and NK Ester M-230G, manufactured by Shin-Nakamura Chemical Co., Ltd.; and Blemmer PE series, Blemmer PME-100, Blemmer PME-200, Blemmer PME-400, and Blemmer PME-1000, manufactured by Nippon Oils & Fats Co., Ltd.

The content of monomer A1 in the water insoluble vinyl polymer is preferably 5 to 45% by weight from the viewpoints of print density and ink voscosity, more preferably 5 to 35% by weight.

Specific examples of monomer A2 include polypropylene glycol mono(meth)acrylate.

Specific examples of monomer A3 include ethylene glycol or propylene glycol (meth)acrylate, poly(ethylene glycol or propylene glycol) mono(meth)acrylate, octoxy polyethylene glycol or polypropylene glycol mono(meth)acrylate, octoxy poly(ethylene glycol or propylene glycol) mono(meth)acrylate, stearoxy polyethylene glycol or polypropylene glycol mono(meth)acrylate, stearoxy poly(ethylene glycol or propylene glycol) mono(meth)acrylate, nonylphenoxy polyethylene glycol or polypropylene glycol mono(meth)acrylate, and nonylphenoxy poly(ethylene glycol or propylene glycol) mono(meth)acrylate. They may be used either solely or as a mixture of two or more.

Specific examples of monomer A4 include propylene glycol or tetramethylene glycol mono(meth)acrylate, poly(propylene glycol or tetramethylene glycol) mono(meth)acrylate, propylene glycol or polybutylene glycol mono(meth)acrylate, and poly(propylene glycol or butylene glycol) mono (meth)acrylate. They may be used either solely or as a mixture of two or more.

Among monomers A1 to A4, polypropylene glycol mono (meth)acrylate, ethylene glycol or propylene glycol (meth) acrylate, and poly(ethylene glycol or propylene glycol) mono (meth)acrylate are preferred from the viewpoints of ink viscosity and ejection stability.

Commercially available monomers A2 to A4, include, for example, Blemmer PP-1000, Blemmer PP-500, Blemmer PP-800, Blemmer AP-150, Blemmer AP-400, Blemmer AP-550, Blemmer AP-800, Blemmer 50 PEP-300, Blemmer 70 PEP-350B, Blemmer AEP series, Blemmer 30 PPT-800, Blemmer 50 PPT-800, Blemmer 70 PPT-800, Blemmer APT series, Blemmer 10 PPB-500B, Blemmer 10 APB-500B, Blemmer 50 POEP-800B, Blemmer 50 AOEP-800B, Blemmer ASEP series, Blemmer PNEP series, Blemmer PNPE series, Blemmer 43 ANEP-500, and Blemmer 70 ANEP-550, manufactured by Nippon Oils & Fats Co., Ltd.

The content of monomers A1 to A4 in the water insoluble vinyl polymer is preferably 5 to 45% by weight, more preferably 5 to 35% by weight, from the viewpoints of gloss of the printed matter and high print density.

[2] Salt Forming Group-Containing Monomer

Preferred salt forming group-containing monomers are anionic monomers and cationic monomers. The anionic monomers and the cationic monomers may be used either solely or as a mixture of two or more.

Anionic monomers include unsaturated carboxylic acid monomers, unsaturated sulfonic acid monomers, and unsaturated phosphoric acid monomers.

Unsaturated carboxylic acid monomers include, for example, acrylic acid, methacrylic acid, crotonic acid, itaconic acid, maleic acid, fumaric acid, citraconic acid, and 2-methacryloyloxymethylsuccinic acid. They may be used either solely or as a mixture of two or more.

Unsaturated sulfonic acid monomers include, for example, styrenesulfonic acid, 2-acrylamido-2-methylpropanesulfonic acid, 3-sulfopropyl (meth)acrylate, and bis-(3-sulfopropyl) itaconate. They may be used either solely or as a mixture of two or more.

Unsaturated phosphoric acid monomers include, for example, vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate. They may be used either solely or as a mixture of two or more.

Among the anionic monomers, unsaturated carboxylic acid monomers are preferred from the viewpoints of ink viscosity and ejection stability, and acrylic acid and methacrylic acid are more preferred.

Cationic monomers include unsaturated tertiary amine-containing vinyl monomers and unsaturated ammonium salt-containing vinyl monomers. Among them, N,N-dimethylaminoethyl (meth)acrylate, N,N-dimethylaminopropyl (meth)acrylamide, and vinylpyrrolidone are preferred.

Unsaturated tertiary amine-containing monomers include, for example, N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, N,N-dimethylarylamine, vinylpyrrolidone, 2-vinylpyridine, 4-vinylpyridine, 2-methyl-6-vinylpyridine, and 5-ethyl-2-vinylpyridine. They may be used either solely or as a mixture of two or more.

Unsaturated ammonium salt-containing monomers include, for example, quaternalized N,N-dimethylaminoethyl (meth)acrylate, quaternalized N,N-diethylaminoethyl (meth)acrylate, and quaternalized N,N-dimethylaminopropyl (meth)acrylate. They may be used either solely or as a mixture of two or more.

The content of the salt forming group-containing monomer in water insoluble vinyl polymer A is preferably 3 to 40% by weight, more preferably 5 to 30% by weight, from the viewpoints of dispersion stability and ejection stability.

[3] Monomer Copolymerizable with Polyoxyalkylene Group-Containing Monomer and Salt Forming Group-Containing Monomer Monomers copolymerizable with the polyoxyalkylene group-containing monomer and the salt forming group-containing monomer include, for example, macromers, long-chain alkyl group-containing monomers, aromatic ring-containing monomers, and (meth)acrylic esters. Among them, one or more of macromers, long-chain alkyl group-containing monomers, and aromatic ring-containing monomers are preferably used. The monomer copolymerizable with the polyoxyalkylene group-containing monomer and the salt forming group-containing monomer can suppress a change in viscosity of the water-based ink caused by a wetting agent and a dispersant added in the preparation of the water-based ink. Further, the storage stability of the water-based ink can be enhanced. They may be used either solely or as a mixture of two or more. Preferably, one or more materials selected from the group consisting of macromers, long-chain alkyl group-containing monomers, and aromatic ring-containing monomers are contained in the copolymerizable monomer.

Macromers include those that have a polymerizable functional group on one end thereof and preferably have a number average molecular weight of 500 to 500,000, more preferably 1,000 to 10,000.

Specific examples of macromers include styrene macromers having a polymerizable functional group on one end thereof, silicone macromers having a polymerizable functional group on one end thereof, methyl methacrylate macromers having a polymerizable functional group on one end thereof, styrene-acrylonitrile macromers having a polymerizable functional group on one end thereof, butyl acrylate macromers having a polymerizable functional group on one end thereof, and isobutyl methacrylate macromers having a polymerizable functional group on one end thereof. Among them, styrene macromers having a polymerizable functional group on one end thereof are preferred from the viewpoint of satisfactorily incorporating the colorant into the vinyl polymer.

A styrene homopolymer having a polymerizable functional group on its one end and a copolymer of styrene with another monomer having a polymerizable functional group on its one end may be mentioned as the styrene macromer containing a polymerizable functional group on its one end.

In the copolymer of styrene with another monomer having a polymerizable functional group on its one end, examples of another monomers include acrylonitrile. The content of styrene is preferably not less than 60% by weight, more preferably not less than 70% by weight, from the viewpoint of satisfactorily incorporating the pigment in the vinyl polymer.

Among styrene macromers having a polymerizable functional group on one end thereof, those having an acryloyl or methacryloyl group as the polymerizable functional group on one end thereof are preferred.

Commercially available styrene macromers include, for example, AS-6, AS-6S, AN-6, AN-6S, HS-6S, and HS-6, manufactured by TOAGOSEI Co., Ltd.

In the long-chain alkyl group-containing monomer, the number of carbon atoms of the long-chain alkyl group is preferably 16 to 30, more preferably 18 to 22 from the viewpoint of, because they are easily available. For example, compounds represented by formula (V) may be mentioned as the long-chain alkyl group-containing monomer.

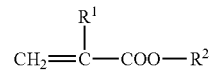

wherein $R^1$ represents a hydrogen atom or a lower alkyl group having 1 to 4 carbon atoms; $R^2$ represents a monovalent hydrocarbon group optionally having a hetero atom and having 16 to 30, preferably 18 to 30, more preferably 18 to 22 carbon atoms.

Specific examples of long-chain alkyl group-containing monomers include (meth)acrylic esters such as (iso)cetyl (meth)acrylate, (iso)stearyl (meth)acrylate, and (iso)behenyl (meth)acrylate. They may be used either solely or as a mixture of two or more. Among them, (iso)stearyl (meth)acrylate and/or (iso)behenyl (meth)acrylate are more preferred. When the long-chain alkyl group-containing monomer is used, a change in viscosity of the water-based ink caused by a wetting agent or a dispersant added in the preparation of the water-based ink can be suppressed to improve the storage stability. In this case, the total amount of stearyl (meth)acrylate and behenyl (meth)acrylate in the monomer mixture is preferably 5 to 50% by weight, more preferably 10 to 30% by weight. When the total amount is in the above-defined range, the storage stability can be further improved.

Various monomers may be used as the aromatic ring-containing monomer. The aromatic ring-containing monomer is preferably at least one monomer selected from the group consisting of styrene, vinylnaphthalene, α-methylstyrene, vinyltoluene, ethyl vinylbenzene, 4-vinylbiphenyl, 1,1-diphenylethylene, benzyl (meth)acrylate, phenoxyethyl (meth)acrylate, 2-hydroxy-3-phenoxypropyl acrylate, 2-methacryloyloxyethyl-2-hydroxypropyl phthalate, 2-acryloyloxyethylphthalic acid, and neopentyl glycol acrylate benzoate. When these monomers are used, the waterfastness of the recorded matter can be further improved. Among them, at least one monomer selected from the group consisting of styrene, α-methylstyrene, vinyltoluene, and vinylnaphthalene is more preferred. The use of these monomers can contribute to further improved waterfastness of the recorded matter and the rubbing/scratch resistance of the recorded matter.

(Meth)acrylic esters include, for example, (meth)acrylic esters in which the ester part is an alkyl group having 1 to 18 carbon atoms, for example, methyl (meth)acrylate, ethyl (meth)acrylate, (iso)propyl (meth)acrylate, (iso or tertiary) butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate. They may be used either solely or as a mixture of two or more.

The term "(iso or tertiary)" and the term "(iso)" mean both the case where these groups are present and the case where these groups are absent. When these groups are absent, the compounds are normal.

The content of the copolymerizable monomer in the water insoluble vinyl polymer is preferably 15 to 90% by weight, more preferably 35 to 80% by weight, from the viewpoints of print density and waterfastness.

When the aromatic ring-containing monomer is contained in the vinyl polymer, the content is preferably 0.1 to 70% by weight, more preferably 1 to 50% by weight, from the viewpoints of waterfastness, rubbing/scratch resistance, ink viscosity, and ejection stability.

Monomer Composition B

Monomer composition B comprises styrene monomer [4] and a monomer [5] copolymerizable with a styrene monomer.

The addition amount of the styrene monomer [4] is preferably 10 to 90 parts by weight based on 100 parts by weight of the whole monomer composition B.

When the addition amount of the styrene monomer is less than 10 parts by weight, the recovery from clogging of the water-based ink is sometimes deteriorated. On the other hand, when the addition amount exceeds 90 parts by weight, the dispersion stability of polymer particles B is likely to be lowered.

[5] Monomer Copolymerizable with Styrene Monomer

Monomers copolymerizable with the styrene monomer include acrylic esters, methacrylic esters, unsaturated carboxylic acids, hydroxyl group-containing vinyl compounds, aromatic vinyl compounds, unsaturated amides, aminoalkyl acrylates or aminoalkyl methacrylates, or their quaternary chlorides, for example, with methyl halides, ethyl halides, or benzyl halides, N-aminoalkylacrylamides or N-aminoalkylmethacrylamides, or their quaternary chlorides, for example, with methyl halides, ethyl halides, or benzyl halides, vinyl esters, vinylidene halides, diacrylates, and dimethacrylates.

Acrylic esters include esters of alkyls having 1 to 12 carbon atoms with acrylic acid, for example, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, and benzyl acrylate.

Methacrylic esters include esters of alkyls having 1 to 12 carbon atoms with methacrylic acid, for example, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, and benzyl methacrylate.

Unsaturated carboxylic acids include acrylic acid, methacrylic acid, itaconic acid, maleic acid, fumaric acid, acrylic anhydride, methacrylic anhydride, maleic anhydride, itaconic anhydride, and fumaric anhydride.

Hydroxyl group-containing vinyl compounds include 2-hydroxyethyl acrylate, 3-hydroxypropyl acrylate, 4-hydroxybutyl acrylate, 2-hydroxyethyl methacrylate, 2-hydroxypropyl methacrylate, and 4-hydroxybutyl methacrylate.

Aromatic vinyl compounds include 2-methylstyrene, t-butylstyrene, chlorostyrene, vinylanisole, vinylnaphthalene, and divinylbenzene.

Unsaturated amides include acrylamide, methacrylamide, N-isopropylacrylamide, N,N-dimethylacrylamide, N,N-dimethylmethacrylamide, N,N-diethylacrylamide, N,N-diethylmethacrylamide, N-methylolmethacrylamide, N-methylolacrylamide, diacetoneacrylamide, and maleic acid amide.

Aminoalkyl acrylates or aminoalkyl methacrylates, or their quaternary chlorides, for example, with methyl halides, ethyl halides, or benzyl halides include N,N-dimethylaminoethyl acrylate, N,N-dimethylaminoethyl methacrylate, N,N-dimethylaminopropyl acrylate, N,N-dimethylaminopropyl methacrylate, N,N-t-butylaminoethyl acrylate, N,N-t-butylaminoethyl methacrylate, N,N-monomethylaminoethyl acrylate, and N,N-monomethylaminoethyl methacrylate, or their quaternary chlorides, for example, with methyl halides, ethyl halides, or benzyl halides.

N-Aminoalkylacrylamides or N-aminoalkylmethacrylamides, or their quaternary chlorides, for example, with methyl halides, ethyl halides, or benzyl halides include N,N-dimethylaminopropylacrylamide, N,N-dimethylaminopropylmethacrylamide, N,N-dimethylaminoethylacrylamide, and N,N-dimethylaminoethylmethacrylamide, or their quaternary chlorides, for example, with methyl halides, ethyl halides, or benzyl halides.

Vinyl esters include vinyl acetate and vinyl propionate.

Vinylidene halides include vinylidene chloride and vinylidene fluoride.

Diacrylates include polyethylene glycol diacrylate, 1,6-hexanediol diacrylate, neopentyl glycol diacrylate, tripropylene glycol diacrylate, and polypropylene glycol diacrylate.

Dimethacrylates include ethylene glycol dimethacrylate, diethylene glycol dimethacrylate, triethylene glycol dimethacrylate, polyethylene glycol dimethacrylate, polypropylene glycol dimethacrylate, neopentyl glycol dimethacrylate, 1,3-butylene glycol dimethacrylate, 1,6-hexanediol dimethacrylate, and neopentyl glycol dimethacrylate.

Other monomers include trimethylolpropane trimethacrylate, trimethylolpropane triacrylate, tetramethylolmethane triacrylate, tetramethylolmethane tetraacrylate, allyl methacrylate, dicyclopentenyl acrylate, dicyclopentenyloxyethyl acrylate and the like, vinyl chloride, vinyl ether, vinyl ketone, vinylamide, chloroprene, ethylene, propylene, isoprene, butadiene, vinylpyrrolidone, 2-methoxyethyl acrylate, 2-ethoxyethyl acrylate, glycidyl acrylate, glycidyl methacrylate, allyl glycidyl ether, acrylonitrile, methacrylonitrile, isopropenyl-α,α-dimethylbenzyl isocyanate, and allylmercaptan.

Only one monomer may be used as the other monomer, or alternatively two or more monomers may be used in combination. Particularly suitable monomers include alkyl esters or hydroxyalkyl esters of acrylic acid or methacrylic acid, for example, methyl acrylate, ethyl acrylate, n-butyl acrylate, isobutyl acrylate, 2-ethylhexyl acrylate, ethyl methacrylate, n-butyl methacrylate, isobutyl methacrylate, 2-ethylhexyl methacrylate, 2-hydroxyethyl acrylate, and 2-hydroxyethyl methacrylate.

Monomers [5] copolymerizable with the styrene monomer may be used either solely or as a mixture of two or more.

In particular, the monomer [5] copolymerizable with the styrene monomer preferably contains at least one monomer selected from the above unsaturated carboxylic acids, unsaturated amides, and monomers having two or more polymerizable double bonds in one molecule thereof.

The storage stability of the ink and the recovery from clogging can be improved by using the unsaturated carboxylic acids as the monomer [5] copolymerizable with the styrene monomer.

The amount of the unsaturated carboxylic acid added to monomer composition B is preferably 3 to 8 parts by weight based on 100 parts by weight of the whole monomer composition B.

When the addition amount of the unsaturated carboxylic acid is less than 3 parts by weight, the effect of improving the storage stability of the ink and the recovery from clogging is sometimes lowered. On the other hand, when the addition amount exceeds 8 parts by weight, the ink viscosity is sometimes increased.

Monomers having two or more polymerizable double bonds in one molecule include diacrylates, dimethacrylates, trimethylolpropane trimethacrylate, trimethylolpropane triacrylate, tetramethylolmethane triacrylate, tetramethylolmethane tetraacrylate, or other polyvalent esters of polyhydric alcohols with unsaturated carboxylic acids.

The amount of the monomer having two or more polymerizable double bonds in one molecule added to monomer composition B is preferably 0.3 to 10 parts by weight, more preferably 5 to 10 parts by weight, based on 100 parts by weight of the whole monomer composition B.

When the addition amount of the monomer having two or more polymerizable double bonds in one molecule is less than 0.3 part by weight, the dispersion stability of polymer particles B is deteriorated. In this case, when the water-based ink is used as the ink for ink jet recording, an ink ejection port in an ink cartridge is likely to be clogged, and, further, the printing stability is likely to be poor.

On the other hand, when the addition amount of the monomer having two or more polymerizable double bonds in one molecule exceeds 10 parts by weight, the monomer remaining unreacted is present and, consequently, an odor is sometimes emitted.

In the present invention, when the amount of the monomer having two or more polymerizable double bonds in one molecule added to monomer composition B is 5 to 10 parts by weight, stability of continuous printing is further improved.

The storage stability of the ink and the recovery from clogging can be improved by using the unsaturated amide as the monomer [5] copolymerizable with the styrene monomer.

The amount of the unsaturated amide added to monomer composition B is preferably 0.05 to 2 parts by weight based on 100 parts by weight of the whole monomer composition B.

When the addition amount of the unsaturated amide is less than 0.05 part by weight, the effect of improving the storage stability of the ink and the recovery from clogging is sometimes lowered. On the other hand, when the addition amount exceeds 2 parts by weight, the ink viscosity is sometimes increased.

Synthesis of Water Insoluble Vinyl Polymer A

Water insoluble vinyl polymer A may be synthesized by polymerizing the above monomer composition A by the following method.

Water insoluble vinyl polymer A is produced by polymerizing monomer composition A by a conventional polymerization method such as a bulk polymerization method, a solution polymerization method, a suspension polymerization method, or an emulsion polymerization method. Among these polymerization methods, the solution polymerization method is preferred.

A polar organic solvent is preferably used as the solvent in the solution polymerization method. When the polar organic solvent is miscible with water, the polar organic solvent may be used as a mixture with water.

Polar organic solvents include, for example, aliphatic alcohols having 1 to 3 carbon atoms such as methanol, ethanol, and propanol; ketones such as acetone and methyl ethyl ketone; and esters such as ethyl acetate. Among them, methanol, ethanol, acetone, methyl ethyl ketone, or a mixed liquid composed of the above solvent with water is prepared.

Further, in the polymerization of monomer composition A, a radical polymerization initiator may be used.

Radical polymerization initiators include azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile); and organic peroxides such as t-butylperoxyoctoate, di-t-butylperoxide, and dibenzoyloxide.

The addition amount of the polymerization initiator per mole of monomer composition A is preferably 0.001 to 5 moles, more preferably 0.01 to 2 moles.

In the polymerization of monomer composition A, in addition to the radical polymerization initiator, a polymerization chain transfer agent may be added.

Polymerization chain transfer agents usable herein include mercaptanes such as octylmercaptan, n-dodencylmercaptan, t-dodecylmercaptan, n-tetradecylmercaptan, and 2-mercaptoethanol; xanthogen disulfides such as dimethylxanthogen disulfide and diisopropylxanthogen disulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, Y-terpinene, dipentene, α-methylstyrene dimmer, 9,10-dihydroanthracene, 1,4-dihydronaphthalene, indene, and 1,4-cyclohexadiene; and unsaturated hetetrocyclic compounds such as 2,5-dihydrofuran. These polymerization chain transfer agents may be used either solely or as a mixture of two or more.

Polymerization conditions for monomer composition A vary depending, for example, upon radical polymerization initiators, monomers, and the type of solvents used and thus cannot be determined unconditionally. In general, the polymerization temperature is preferably 30 to 100° C., more preferably 50 to 80° C. The polymerization time is preferably 1 to 20 hr. The polymerization atmosphere is preferably an inert gas atmosphere such as nitrogen gas.

After the completion of the polymerization reaction, the produced vinyl polymer is isolated from the reaction solution by a conventional method such as reprecipitation from the reaction solution or removal of the solvent by evaporation. The vinyl polymer thus obtained may be purified by removing the unreacted monomer and the like, for example, by the repetition of reprecipitation, membrane separation, chromatography, or extraction.

Yellow Pigment

Polymer particles A contain a yellow pigment. Yellow pigments usable herein include C.I. Pigment Yellow 13, C.I. Pigment Yellow 74, C.I. Pigment Yellow 83, C.I. Pigment Yellow 109, C.I. Pigment Yellow 110, C.I. Pigment Yellow 128, C.I. Pigment Yellow 151, C.I. Pigment Yellow 155, and C.I. Pigment Yellow 180.

The amount of the yellow pigment is preferably 50 to 1000 parts by weight, more preferably 80 to 800 parts by weight, still more preferably 100 to 600 parts by weight, based on 100 parts by weight of the resin solid content of the polymer, from the viewpoints of print density and easy incorporation of the yellow pigment in the polymer particles.

Preparation of Polymer Particles A

The yellow pigment-containing polymer particles A may be produced, for example, by steps (1) to (4).

(1) Step of mixing: A yellow pigment and a water insoluble vinyl polymer for the formation of polymer particles A are mixed with an organic solvent solution, water, and optionally a neutralizing agent by using a conventional mixing/stirring device such as an anchor blade or a turbine blade to prepare a starting material mixture.

In this case, for preparing satisfactorily fine particles, preferably, the mixture is kneaded by a kneader. Kneaders usable for kneading may be classified into batch type and continuous type. Double-arm type kneaders may be mentioned as the batch type kneader, and self-cleaning type kneaders may be mentioned as the continuous type kneader. Among them, the double-arm type kneader is preferred, for example, from the viewpoints of switching of the type and tank cleaning.

(2) Step of dispersing; Next, the raw material mixture thus obtained is diluted to a desired solid concentration, followed by dispersion treatment. In the dispersion treatment, for example, ball mills, roll mills, bead mills, high-pressure homogenizers, and high-speed stirring type dispergators may be used. Among them, high-pressure homogenizers which are less likely to cause inclusion of inorganic impurities are preferred. High-pressure homogenizers include those provided with a chamber to which a treatment liquid flow passage has been fixed, and those provided with a homogenizing valve capable of regulating the width of a treatment liquid flow passage. High-pressure homogenizers provided with a chamber to which a treatment liquid flow passage has been fixed, include MICROFLUIDIZER (tradename; manufactured by Microfluidics), Nanomizer (tradename; manufactured by Nanomizer Co., Ltd.), and Altimizer (tradename; manufactured by SUGINO MACHINE LIMITED). High-pressure homogenizers provided with a homogenizing valve include HIGH PRESSURE HOMOGENIZER (tradename; manufactured by Raney), HIGH PRESSURE HOMOGENIZER (tradename; manufactured by SANMARU MACHINERY Co., LTD.), and HIGH PRESSURE HOMOGENIZER (tradename; manufactured by IZUMI FOOD MACHINERY CO., LTD.). The pressure for dispersion with the high-pressure homogeneizer is preferably not less than 50 MPa, more preferably not less than 80 MPa, because polymer particles having a desired particle diameter can easily be produced in a short time.

(3) Step of removing solvent: Next, the organic solvent and a predetermined amount of water are removed from the starting material mixture subjected to the dispersion treatment to prepare a water-based ink having a desired concentration according to the present invention. The step of removing organic solvent may be carried out before or after the step of dispersion.

The organic solvent is preferably removed by a vacuum distillation method, particularly by a thin-film vacuum distillation method. The amount of the organic solvent removed is not particularly limited. Preferably, however, the whole amount of the organic solvent is removed.

(4) Step of removing coarse particles: After the removal of the solvent, if necessary, coarse particles may be removed. An ink having high dispersion stability can be prepared, for example, by filtering the ink prepared above under the pressure, or treating the ink by a centrifuge, to remove particles having a size of preferably not less than 2 μm, more preferably not less than 1 μm, still more preferably not less than 0.5 μm.

The step of mixing will be described in detail.

Preferred organic solvents usable in the step of mixing include alcohol solvents, ketone solvents, ether solvents, aromatic hydrocarbon solvents, aliphatic hydrocarbon solvents, and halogenated aliphatic hydrocarbon solvents. Hydrophilic organic solvents are still more preferred.

Alcohol solvents include methanol, ethanol, isopropanol, n-butanol, tertiary butanol, isobutanol, and diacetone alcohol. Ketone solvents include acetone, methyl ethyl ketone, diethyl ketone, and methyl isobutyl ketone. Ether solvents include dibutyl ether, tetrahydrofuran, and dioxane. Aromatic hydrocarbon solvents include benzene and toluene. Aliphatic hydrocarbon solvents include heptane, hexane, and cyclohexane. Halogenated aliphatic hydrocarbon solvents include methylene chloride, 1,1,1-trichloroethane, chloroform, carbon tetrachloride, and 1,2-dichloroethane. Among them, acetone and methyl ethyl ketone are preferred.

The content of the yellow pigment is preferably 50 to 1000 parts by weight, more preferably 80 to 800 parts by weight, still more preferably 100 to 600 parts by weight, based on 100 parts by weight of the resin solid content of the polymer from the viewpoint of print density.

From the viewpoint of affinity for the yellow pigment, the amount of the organic solvent is preferably not less than 20 parts by weight, more preferably not less than 30 parts by weight, still more preferably not less than 50 parts by weight, based on 100 parts by weight of the resin solid content of the polymer. From the viewpoint of providing effective shear force in the kneading of the mixture, the amount of the organic solvent is preferably not more than 500 parts by weight, more preferably not more than 300 parts by weight, still more preferably not more than 200 parts by weight, based on 100 parts by weight of the resin solid content of the polymer. Accordingly, the amount of the organic solvent is preferably 20 to 500 parts by weight, more preferably 30 to 300 parts by weight, still more preferably 50 to 200 parts by weight, based on 100 parts by weight of the resin solid content of the polymer.

The amount of water is preferably 50 to 1000 parts by weight, more preferably 100 to 500 parts by weight, based on 100 parts by weight of the organic solvent from the viewpoint of compatibility with the pigment.

The solid concentration of the mixture is preferably not less than 50% by weight, more preferably 65% by weight, from the viewpoint of providing effective shear force in the kneading of the mixture, and is preferably not more than 80% by weight, more preferably not more than 75% by weight, from the viewpoints of avoiding that the viscosity of the kneaded product is so high that homogeneous kneading is impossible, and, at the same time, avoiding that the kneaded product is disintegrated into particles. Accordingly, the solid concentration of the mixture is preferably not less than 50% by weight, more preferably 50 to 80% by weight, still more preferably 65 to 80% by weight, particularly preferably 65 to 75% by weight.

The solid content of the mixture refers to the total solid content of the pigment, polymer and neutralizing agent.

The average particle diameter of polymer particles A containing a yellow pigment as the colorant is larger than polymer particles B not containing the colorant and is preferably 10 to 500 nm, more preferably 20 to 300 nm, still more preferably 50 to 200 nm, from the viewpoints of gloss of printed mater, nozzle clogging prevention, and dispersion stability.

Preparation of Polymer Particles B

Polymer particles B used in this invention may be produced using the styrene monomer [4] and the monomer [5] copolymerizable with the styrene monomer directly by a conventional emulsion polymerization method, or by finely dispersing a copolymer, produced by other polymerization method, in a liquid medium based on a mechanical emulsification method.

Methods using the emulsion polymerization method include a method in which various monomers are introduced at a time and are polymerized in the presence of a dispersant and a polymerization initiator, and a method in which polymerization is carried out while continuously feeding monomers. In this case, the polymerization is generally carried out in a temperature range of 30 to 90° C., and a water dispersion substantially composed of copolymer particles generally called an emulsion, i.e., polymer particles B, can be obtained.

The water dispersion of the copolymer particles produced by the emulsion polymerization method is advantageous in that the water dispersion is very stable in a minor amount of dispersant and a water dispersion having a very small particle diameter can easily be produced.

Dispersants usable in the emulsion polymerization method include nonionic surfactants, anionic surfactants, nonionic water soluble polymers, and anionic water soluble polymers. One or at least two of them may be selected.

Specific examples of nonionic surfactants include polyoxyethylene lauryl ether, polyoxyethylene octylphenyl ether, polyoxyethylene oleylphenyl ether, polyoxyethylene nonylphenyl ether, oxyethylene-oxypropylene block copolymer, t-octylphenoxyethyl polyethoxyethanol, and nonylphenoxyethyl polyethoxyethanol. One or at least two of them may be selected.

Specific examples of anionic surfactants include sodium dodecylbenzenesulfonate, sodium laurylsulfate, sodium alkyl diphenyl ether disulfonates, sodium alkylnaphthalanesulfonates, sodium dialkylsulfosuccinates, sodium stearate, potassium oleate, sodium dioctylsulfosucinate, sodium polyoxyethylene alkyl ether sulfates, sodium polyoxyethylene alkyl ether sulfates, sodium polyoxyethylene alkylphenyl ether sulfates, sodium dialkylsulfosuccinate, sodium stearate, sodium oleate, and sodium t-octylphenoxyethoxypolyethoxyethyl sulfate. One or at least two of them may be selected.

Nonionic water soluble polymers include polyvinyl alcohol or its derivatives; starch derivatives such as oxidized starch, etherified starch, and phosphoric esterified starch; polyvinylpyrrolidone derivatives such as polyvinylpyrrolidone or polyvinylpyrrolidone copolymerized with vinyl acetate; cellulose derivatives such as carboxymethylcellulose and hydroxymethylcellulose; polyacrylamide or its derivatives; polymethacrylamide or its derivatives; and gelatin and casein. One or at least two of them may be selected.

Anionic water soluble polymers include polyalginic acid and its metal salts, carboxymethylcellulose and its metal salts, polyacrylic acid and its metal salts, a partial hydrolyzate of polyacrylamide and its metal salts, maleic acid copolymers, lignin sulfonic acid and its metal salts and their derivatives, oxyorganic acid and its metal salts, alkylallylsulfonic acids and its metal salts, polyoxyalkyl allyl ethers, polyol composites, higher polyhydric alcohol sulfonic acid and its metal salts, and gelatin, glue or other water soluble protein and its metal salt and their derivatives. One or at least two of them may be selected.

The amount of the dispersant used is not particularly limited. In general, however, the amount of the dispersant is 0.02 to 20% by weight, more preferably 0.02 to 10% by weight, most preferably 0.02 to 5% by weight, based on the total weight of the monomers to be copolymerized.

Conventional radical initiators may be used as an initiator in the copolymerization. Examples thereof include hydrogen peroxide; persulfates such as ammonium persulfate and potassium persulfate; organic peroxides such as cumene hydroperoxide, t-butylhydroperoxide, benzoylperoxide, t-butylperoxy-2-ethyl hexanoate, t-butylperoxybenzoate, and lauroyl peroxide; azo compounds such as azobisisobutyronitrile, 2,2'-azobis(2-amidinopropane) dihydrochloride, 2,2'-azobis[2-(N-phenylamidino)propane] dihydrochloride, 2,2'-azobis{2-[N-(4-chlorophenyl)amidino]propane} dihydrochloride, 2,2'-azobis{2-[N-(4-hydroxyphenyl)amidino]propane} dihydrochloride, 2,2'-azobis[2-(N-benzylamidino)propane] dihydrochloride, 2,2'-azobis[2-(N-allylamidino)propane] dihydrochloride, 2,2'-azobis{2-[N-(2-hydroxyethyl)amidino]propane} dihydrochloride, 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], and 2,2'-azobis (isobutylamide) dihydrate; or redox initiators comprising a combination of them with a reducing agent such as a metal ion such as an iron ion and sodium sulfoxylate, formaldehyde, sodium pyrosulfite, sodium hydrogensulfite, L-ascrobic acid, or Rongalit. One or at least two of them may be selected.

The amount of the initiator used is generally 0.01 to 20% by weight based on the total weight of the monomers to be copolymerized.

If necessary, mercaptans such as t-dodecylmercaptan and n-dodecylmercaptan, and allylated compounds such as allylsulfonic acid, methallylsulfonic acid and sodium salts of these compounds can be used as a molecular weight regulator.

Further, if necessary, for example, sulfuric acid, hydrochloric acid, nitric acid, sodium hydroxide, potassium hydroxide, magnesium sulfate, potassium sulfate, aluminum sulfate, sodium acetate, magnesium acetate, potassium acetate, ammonia, triethanolamine, diethanolamine, and monoethanolamine may also be used as a pH adjustor.

Preferably, the water insoluble vinyl polymer constituting polymer particles B used in the present invention has a glass transition temperature of 20 to 200° C. The glass transition temperature may be regulated by varying the amount of each component incorporated in monomer composition B and may be determined from a DSC curve based on JIS K 7121.

The water insoluble vinyl polymer constituting polymer particles B used in the present invention has a minimum film forming temperature (MFT) of 20° C. or above, more preferably 20 to 200° C. When the minimum film forming temperature is below 20° C., ink reliability such as the storage stability of ink, the recovery from clogging, or continuous printing stability is lowered.

As with the glass transition temperature, the minimum film forming temperature can be regulated by varying the amount of the components incorporated in monomer composition B.

The minimum film forming temperature refers to the lowest temperature necessary for binding polymer particles to each other to form a film. The minimum film forming temperature may be measured by a temperature gradient plate method as described, for example, in Souichi Muroi "Kobunshi Ratekkusu No Kagaku (Polymer Latex Chemistry)" (1997).

The minimum film forming temperature of the polymer particles may be measured, for example, by the following method. A water dispersion liquid of polymer particles is first uniformly coated onto a PET film at a coverage of 5 g/m$^2$ on a dry solid basis to prepare a measuring sample. A commercially available laminator is then applied through a silicone release film on different temperature levels at a speed of 18 cm/min onto the measuring sample to determine, as the minimum film forming temperature, the lowest temperature at which a continuous film can be formed.

The criteria of the formation of a continuous film are to satisfy three requirements that the coating layer is transparent, the coating layer is smooth, and a material which comes off from the coating layer when the surface is scraped with a sharp utensil, is not in a noncontinuous form but in a continuous film.

The average particle diameter of polymer particles B used in the present invention is 30 to 60 nm, preferably 35 to 55 nm. When the average particle diameter is less than 30 nm, the ink viscosity is increased. On the other hand, when the average particle diameter exceeds 60 nm, in printing using the water-based ink according to the present invention, the gloss of the printed face is lowered making it impossible to provide high-quality printed matter.

The particle diameter of polymer particles B is regulated by varying the amount of the surfactant and polymerization initiator used. When the amount of the surfactant used is increased, the particle diameter is reduced. When the amount of the polymerization initiator used is reduced, the particle diameter is reduced.

Preparation of Water-Based Ink

The water-based ink according to the present invention can be produced by thoroughly dispersing and mixing the polymer particles A containing a yellow pigment and the polymer particles B not containing any pigment in a mixed organic solvent.

The content of the colorant in the water-based ink according to the present invention is not particularly limited so far as satisfactory print density is provided. From the viewpoint of imparting satisfactory ejection stability and print density, however, the colorant content is preferably 1 to 30% by weight, more preferably 2 to 10% by weight, still more preferably 4 to 8% by weight.

The mixing ratio between polymer particles A and polymer particles B is preferably 1:1 to 15:1, more preferably 3:1 to 10:1.

Water contained in the water-based ink according to the present invention is a main solvent. Water is preferably pure water or ultrapure water obtained by ion exchange, ultrafiltration, reverse osmosis, distillation or the like. In particular, water, which has been sterilized, for example, by ultraviolet irradiation or by addition of hydrogen peroxide, is preferred, because this treatment can prevent the growth of mold or bacteria and, thus, the ink composition can be stored for a long period of time.

The water-based ink according to the present invention preferably contains a water soluble organic compound. Water soluble organic compounds include, for example, alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, sorbit, maltose, cellobiose, lactose, sucrose, trehalose, and maltotriose; sugar alcohols; hyaluronic acids; the so-called solid wetting agents such as ureas; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone; N-methyl-2-pyrrolidone; 1,3-dimethyl-2-imidazolidinone; formamide; acetamide; dimethyl sulfoxide; sorbit; sorbitan; acetin; diacetin; triacetin; and sulfolane. They may be used solely or in a combination of two or more. The content of these water soluble organic solvents in the ink composition is preferably 10 to 50% by weight based on the ink composition from the viewpoints of ensuring proper property values such as viscosity of the ink composition and ensuring print quality and reliability.

The addition of alkanediols among the above water soluble organic compounds can contribute to improved gloss of the recorded matter.

Specific examples of alkanediols include propanediol, butanediol, pentanediol, and octanediol. Among the alkanediols, 1,2-alkanediols are preferred. Particularly preferred are 1,2-pentanediol and 1,2-hexanediol.

The addition amount of the alkanediol is preferably 0.5 to 5% by weight based on the total amount of the ink composition.

If necessary, the water-based ink according to the present invention may further contain various conventional additives such as pH adjustors, surfactants, antioxidants, ultraviolet absorbers, preservatives or fungicides and the like.

Specific examples of pH adjustors include: hydroxides of alkali metals such as lithium hydroxide, potassium hydroxide, sodium hydroxide and amines such as ammonia, triethanolamine, tripropanolamine, diethanolamine, and monoethanolamine. If necessary, for example, collidine, imidazole, phosphoric acid, 3-(N-morpholino)propanesulfonic acid, tris (hydroxymethyl)aminomethane, and boric acid may be used as pH buffers.

Surfactants usable herein include anionic surfactants, cationic surfactants, amphoteric surfactants, and nonionic surfactants. Nonionic surfactants are particularly preferred because ink compositions which are less likely to cause foaming or frothing can be provided. Specific examples of nonionic surfactants usable herein include: acetylene glycol surfactants; acetylene alcohol surfactants; ether surfactants such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester surfactants such as polyoxyethyleneoleic acid, polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate; silicon surfactants such as dimethylpolysiloxane; and fluorosurfactants such as fluoroalkyl esters and salts of perfluoroalkylcarboxylic acid. Among the nonionic surfactants, acetylene glycol surfactants and acetylene alcohol surfactants are particularly preferred because they are less likely to cause foaming and further have excellent antifoaming properties.

Specific examples of acetylene glycol surfactants and acetylene alcohol surfactants usable herein include 2,4,7,9-tetramethyl-5-decyne-4,7-diol, 3,6-dimethyl-4-octyne-3,6-diol, and 3,5-dimethyl-1-hexyn-3-ol. Commercially available products may also be used, and examples thereof include Surfynol 104, Surfynol 82, Surfynol 465, Surfynol 485, and Surfynol TG, manufactured by Air Products and Chemicals Inc., and OLFINE STG and OLFINE E 1010, manufactured by Nissin Chemical Industry Co., Ltd.

Specific examples of antioxidants or ultraviolet absorbers include allophanates such as allophanate and methyl allophanate; biurets such as biuret, dimethyl biuret, and tetramethyl biuret; L-ascorbic acid and its salt or the like; Tinuvin 328, Tinuvin 900, Tinuvin 1130, Tinuvin 384, Tinuvin 292, Tinuvin 123, Tinuvin 144, Tinuvin 622, Tinuvin 770, and Tinuvin 292, Irgacor 252 and Irgacor 153, and Irganox 1010, Irganox 1076, Irganox 1035, and Irganox MD 1024, manufactured by Ciba-Geigy; and lanthanide oxides.

Specific examples of preservatives or fungicides include sodium benzoate, pentachlorophenol sodium, 2-pyridinethiol-1-oxide sodium, sodium sorbate, sodium dehydroacetate, and 1,2-dibenzisothiazolin-3-one (Proxel CRL, Proxel BDN, Proxel GXL, Proxel XL-2, and Proxel TN, manufactured by Avecia).

In the present invention, the particle diameter of polymer particles A and polymer particles B may be measured by observation under an electron microscope or by a coulter counter or a light scattering method. For example, in the measurement by the coulter counter, Coulter Counter N4 (manufactured by Coulter Electronics K.K.) may be used. In the measurement by the light scattering method, for example, a laser particle diameter analysis system LPA-3000/3100 (Otsuka Denshi K.K.) and a laser diffraction-type particle size distribution measuring apparatus SALD-2000A (Shimadzu Seisakusho Ltd.) may be used.

The water-based ink according to the present invention is suitable for use, for example, in writing utensils such as pens and stamps. Further, the water-based ink according to the present invention has excellent fixation on gloss paper and does not cause clogging of the printer head and thus is suitable as ink for printers for printing by ink jet recording and the like, particularly as water-based ink for ink jet-type printers.

EXAMPLES

The water-based ink according to the present invention will be described in more detail with reference to the following Examples. However, it should be noted that the present invention is not limited to these Examples.

Synthesis of Water Insoluble Vinyl Polymer A

Methyl ethyl ketone (20 parts by weight), 10% by weight of the amount (parts by weight) of each monomer specified in Table 1 below, and a polymerization chain transfer agent (2-mercapto ethanol) in an amount shown in Table 1 below were placed and were mixed together in a reaction vessel, followed by thorough replacement of the air in the reaction vessel by nitrogen gas to prepare a mixed solution.

On the other hand, the remaining 90% by weight of the amount (parts by weight) of each monomer specified in Table 1 below was charged into a dropping funnel. Next, a polymerization chain transfer agent (2-mercapto ethanol) in an amount specified in Table 1, 60 parts by weight of methyl ethyl ketone and 1.2 parts by weight of 2,2'-azobis(2,4-dimethylvaleronitrile) were added to and mixed with the solution in the dropping funnel, followed by thorough replacement of the air in the dropping funnel by nitrogen gas to prepare a mixed solution.

Under a nitrogen atmosphere, the mixed solution within the reaction vessel was heated to 65° C. with stirring, and the mixed solution in the dropping funnel was gradually added dropwise to the contents of the reaction vessel over a period of 3 hr. After the completion of the dropwise addition, the temperature of the mixed solution was maintained at 65° C. for 2 hr. A solution of 0.3 part by weight of 2,2'-azobis(2,4-dimethylvaleronitrile) dissolved in 5 parts by weight of methyl ethyl ketone was added to the mixed solution, and the mixture was ripened at 65° C. for 2 hr and at 70° C. for 2 hr to prepare a polymer solution.

A part of the polymer solution thus obtained was dried under the reduced pressure at 105° C. for 2 hr to remove the solvent for isolation of the polymer. The weight average molecular weight of the polymer was determined by gel-permeation chromatography using polystyrene as a standard substance, and 60 mmol/liter of phosphoric acid and 50 mmol/liter of lithium bromide-containing dimethylformamide as solvents. The results are shown in Table 1 below.

TABLE 1

| | | Production Example | | |
|---|---|---|---|---|
| | | 1 | 2 | 3 |
| Monomer composition, pts. wt. | Polypropylene glycol monomethacrylate (n = 9) | 15 | 15 | 0 |
| | Poly(ethylene glycol.propylene glycol)monomethacrylate | 8 | 0 | 0 |

TABLE 1-continued

|  |  | Production Example | | |
|---|---|---|---|---|
|  |  | 1 | 2 | 3 |
|  | Methacrylic acid | 14 | 20 | 25 |
|  | Styrene monomer | 48 | 50 | 55 |
|  | Styrene macromer | 15 | 15 | 20 |
| Polymerization chain transfer agent 2-Mercaptoethanol | Within reaction vessel | 0.030 | 0.030 | 0.030 |
|  | Within dropping funnel | 0.270 | 0.270 | 0.270 |
| Weight average molecular weight of vinyl polymer | | 60,000 | 60,000 | 60,000 |

Details of individual compounds shown in Table 1 are as follows.

Polypropylene glycol monomethacrylate (n=9): manufactured by Nippon Oils & Fats Co., Ltd., tradename: Blemmer PP-500, a monomer represented by formula (II) wherein $R^1$ represents a methyl group and $R^2$ represents a hydrogen atom.

Styrene macromer: manufactured by Toa Gosei Chemical Industry Co., Ltd., tradename: AS-6S (styrene macromer), number average molecular weight: 6000, polymerizable functional group: methacryloyl group.

Poly(ethylene glycol propylene glycol) monomethacrylate: manufactured by Nippon Oils & Fats Co., Ltd., tradename: Blemmer 50PEP-300, a monomer represented by formula (III) wherein m is 3.5, n is 2.5, $R^1$ represents a methyl group, and $R^2$ represents a hydrogen atom, and wherein oxypropylene groups and oxyethylene groups have been added randomly.

Synthesis of Water Insoluble Vinyl Polymer B

Production Examples of Polymer Particles B (Production Examples 1 to 7 and 9 to 12)

Polymer particles B were synthesized with a flask equipped with a thermometer, a stirrer, a nitrogen introduction tube, a cooling tube, and two dropping funnels. An emulsified liquid prepared by emulsifying in a homomixer a mixing liquid for Production Examples 1 to 7 and 9 to 12 shown in Table 2 below was placed in one of the two dropping funnels. A solution of 0.3 part of potassium persulfate as a catalyst dissolved in 5 parts of water was placed in the other dropping funnel. 0.2 part of sodium lauryl sulfate was dissolved in 190 parts of water in the flask. The air in the flask was replaced by a nitrogen atmosphere. The flask was heated to 70° C. on a hot water bath. A reaction was allowed to proceed by adding the solutions in the two dropping funnels dropwise to the contents of the flask with stirring at 250 rpm over a period of 4 hr. After the completion of the dropwise addition, stirring was continued for additional 4 hr. The contents of the flask were cooled and were neutralized with an aqueous sodium hydroxide solution to prepare polymer particles B having a nonvolatile content of 30%.

The average particle diameter of the polymer particles was measured with Coulter Counter N4 (tradename; manufactured by Coulter Electronics K.K.). The minimum film forming temperature was measured by the method as described above in this specification. The results were as shown in Table 2 below.

Production Examples of Polymer Particles B (Production Example 8)

Polymer particles B were synthesized with a flask equipped with a thermometer, a stirrer, a nitrogen introduction tube, a cooling tube, and two dropping funnels. An emulsified liquid prepared by emulsifying in a homomixer a mixing liquid for Production Example 8 shown in Table 2 was placed in one of the two dropping funnels. A solution of 0.6 part of potassium persulfate as a catalyst dissolved in 5 parts of water was placed in the other dropping funnel. 0.1 part of sodium lauryl sulfate was dissolved in 190 parts of water in the flask. The air in the flask was replaced by a nitrogen atmosphere. The flask was heated to 70° C. on a hot water bath. A reaction was allowed to proceed by adding the solutions in the two dropping funnels dropwise to the contents of the flask with stirring at 250 rpm over a period of 4 hr. After the completion of the dropwise addition, stirring was continued for additional 4 hr. The contents of the flask were cooled and were neutralized with an aqueous sodium hydroxide solution to prepare polymer particles B having a nonvolatile content of 30%.

The average particle diameter of the polymer particles was measured with Coulter Counter N4 (tradename; manufactured by Coulter Electronics K.K.). The minimum film forming temperature was measured by the method as described above in this specification. The results were as shown in Table 2 below.

TABLE 2

| | | Production Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Monomer composition, pts. wt. | Styrene | 72.0 | 62.0 | 65.0 | 64.7 | 65.0 | 64.0 | — | 65.0 | 45.0 | 64.0 | 40.0 | 35.0 |
| | Butyl acrylate | 27.0 | 28.0 | 30.0 | 30.0 | 28.0 | 28.0 | 30.0 | 30.0 | 50.0 | 22.0 | 24.0 | 40.0 |
| | Acrylamide | — | — | — | — | — | 1.0 | — | — | — | 1.0 | 1.0 | 3.5 |
| | Polyethylene glycol dimethacrylate | — | — | — | 0.3 | 2.0 | 2.0 | — | — | — | 8.0 | 6.0 | 6.0 |
| | Methacrylic acid | 1.0 | 10.0 | 5.0 | 5.0 | 5.0 | 5.0 | 5.0 | 5.0 | 5.0 | 5.0 | 1.0 | 5.0 |
| | Sodium lauryl sulfate | 0.3 | 0.3 | 0.3 | 0.3 | 0.3 | 0.3 | 0.3 | 0.3 | 0.3 | 0.3 | 0.3 | 0.3 |
| | Water | 44.0 | 44.0 | 44.0 | 44.0 | 44.0 | 44.0 | 44.0 | 44.0 | 44.0 | 44.0 | 44.0 | 44.0 |
| | Methyl methacrylate | — | — | — | — | — | — | 65.0 | 65.0 | — | — | — | — |
| Particle diameter, nm | | 50 | 50 | 50 | 50 | 50 | 50 | 50 | 100 | 50 | 50 | 30 | 60 |
| Minimum film forming temp., ° C. | | 60 | 45 | 36 | 35 | 40 | 40 | 55 | 40 | 10 | 43 | 45 | 20 |

Preparation of Water-Based Inks

A polymer (10.0 parts by weight) prepared by drying each of the polymer solutions of production Examples 1 to 3 under the reduced pressure was dissolved in 55.0 parts by weight of methyl ethyl ketone. A predetermined amount of a neutralizing agent (a 20% aqueous sodium hydroxide solution) was added to the solution to neutralize 100% of the salt forming group. Further, 23.3 parts by weight of yellow pigment [C.I. Pigment Yellow 74, manufactured by Dainichiseika Color & Chemicals Manufacturing Co., Ltd.; tradename: Fast Yellow 031] was added thereto, and the mixture was kneaded in a bead mill for 2 hr.

Ion exchanged water (120 parts by weight) was added to the kneaded product. The mixture was stirred, and methyl ethyl ketone was removed at 60° C. under the reduced pressure. Further, a part of water was removed to prepare a water dispersion of pigment-containing vinyl polymer particles having a solid content of 20% by weight (polymer particles A). The average particle diameter of the polymer particles was measured with Coulter Counter N4 (tradename; manufactured by Coulter Electronics K.K.). and was found to be 100 nm.

Mixing was carried out using the pigment-containing vinyl polymer particles thus obtained according to the formulations shown in Table 3 below. The resultant mixed liquid was filtered through a needle-free syringe (manufactured by TERUMO CORPORATION) having a capacity of 25 ml equipped with a 0.5-μm filter [an acetylcellulose film, outer diameter: 2.5 cm, manufactured by Fuji Photo Film Co., Ltd.] to remove coarse particles and thus to prepare a water-based ink.

For Examples 2 to 12 and Comparative Examples 1 to 7, the procedure of Example 1 was repeated, except that the formulations were changed to those shown in Tables 3 and 4 below.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| --- | --- | --- | --- | --- | --- | --- | --- | --- | --- | --- | --- | --- |
| Water dispersion of pigment-containing vinyl polymer particles (Production Example 1 in Table 1) | 35.7 | — | — | — | — | — | — | — | — | — | 35.7 | 35.7 |
| Water dispersion of pigment-containing vinyl polymer particles Production Example 2 in Table 1) | — | 35.7 | 35.7 | 35.7 | 35.7 | 35.7 | 35.7 | 35.7 | 35.7 | 35.7 | — | — |
| Polymer emulsion of Production Example 1 in Table 2 | 5.00 | 5.00 | 1.00 | 10.00 | — | — | — | — | — | — | — | — |
| Polymer emulsion of Production Example 2 in Table 2 | — | — | — | — | 5.00 | — | — | — | — | — | — | — |
| Polymer emulsion of Production Example 3 in Table 2 | — | — | — | — | — | 5.00 | — | — | — | — | — | — |
| Polymer emulsion of Production Example 4 in Table 2 | — | — | — | — | — | — | 5.00 | — | — | — | — | — |
| Polymer emulsion of Production Example 5 in Table 2 | — | — | — | — | — | — | — | 5.00 | — | — | — | — |
| Polymer emulsion of Production Example 6 in Table 2 | — | — | — | — | — | — | — | — | 5.00 | — | — | — |
| Polymer emulsion of Production Example 7 in Table 2 | — | — | — | — | — | — | — | — | — | — | — | — |
| Polymer emulsion of Production Example 8 in Table 2 | — | — | — | — | — | — | — | — | — | — | — | — |
| Polymer emulsion of Production Example 9 in Table 2 | — | — | — | — | — | — | — | — | — | — | — | — |
| Polymer emulsion of Production Example 10 in Table 2 | — | — | — | — | — | — | — | — | — | 5.00 | — | — |
| Polymer emulsion of Production Example 11 in Table 2 | — | — | — | — | — | — | — | — | — | — | 5.0 | — |
| Polymer emulsion of Production Example 12 in Table 2 | — | — | — | — | — | — | — | — | — | — | — | 5.0 |
| Glycerin | 14.0 | 14.0 | 14.0 | 14.0 | 14.0 | 14.0 | 14.0 | 14.0 | 14.0 | 14.0 | 14.0 | 14.0 |
| 1,2-Hexanediol | 1.00 | 1.00 | 1.00 | 1.00 | 1.00 | 1.00 | 1.00 | 1.00 | 1.00 | 1.00 | 1.00 | 1.00 |
| Triethylene glycol mono-n-butyl ether | 3.00 | 3.00 | 3.00 | 3.00 | 3.00 | 3.00 | 3.00 | 3.00 | 3.00 | 3.00 | 3.00 | 3.00 |
| 2-Pyrrolidone | 2.00 | 2.00 | 2.00 | 2.00 | 2.00 | 2.00 | 2.00 | 2.00 | 2.00 | 2.00 | 2.00 | 2.00 |
| Olfine E1010*1 | 0.50 | 0.50 | 0.50 | 0.50 | 0.50 | 0.50 | 0.50 | 0.50 | 0.50 | 0.50 | 0.50 | 0.50 |
| Olfine STG*1 | 0.50 | 0.50 | 0.50 | 0.50 | 0.50 | 0.50 | 0.50 | 0.50 | 0.50 | 0.50 | 0.50 | 0.50 |
| Triethanolamine | 1.00 | 1.00 | 1.00 | 1.00 | 1.00 | 1.00 | 1.00 | 1.00 | 1.00 | 1.00 | 1.00 | 1.00 |
| Water | 37.30 | 37.30 | 41.30 | 32.30 | 37.30 | 37.30 | 37.30 | 37.30 | 37.30 | 37.30 | 37.30 | 37.30 |
| Total | 100 | 100 | 100 | 100 | 100 | 100 | 100 | 100 | 100 | 100 | 100 | 100 |

*1manufactured by Nissin Chemical Industry Co., Ltd.

TABLE 4

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| Water dispersion of pigment-containing vinyl polymer particles (Production Example 2 in Table 1) | — | 35.7 | — | 35.7 | 35.7 | 35.7 | — |

TABLE 4-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Water dispersion of pigment-containing vinyl polymer particles (Production Example 3 in Table 1) | 35.7 | — | 35.7 | — | — | — | 35.7 |
| Polymer emulsion of Production Example 1 in Table 2 | — | — | — | — | — | — | — |
| Polymer emulsion of Production Example 2 in Table 2 | — | — | — | — | — | — | — |
| Polymer emulsion of Production Example 3 in Table 2 | — | — | — | — | — | — | — |
| Polymer emulsion of Production Example 4 in Table 2 | — | — | — | — | — | — | — |
| Polymer emulsion of Production Example 5 in Table 2 | — | — | — | — | — | — | — |
| Polymer emulsion of Production Example 6 in Table 2 | — | — | 5.00 | — | — | — | — |
| Polymer emulsion of Production Example 7 in Table 2 | — | — | — | 5.00 | — | — | — |
| Polymer emulsion of Production Example 8 in Table 2 | — | — | — | — | 5.00 | — | — |
| Polymer emulsion of Production Example 9 in Table 2 | — | — | — | — | — | 5.00 | — |
| Polymer emulsion of Production Example 10 in Table 2 | — | — | — | — | — | — | 5.00 |
| Glycerin | 14.0 | 14.0 | 14.0 | 14.0 | 14.0 | 14.0 | 14.0 |
| 1,2-Hexanediol | 1.00 | 1.00 | 1.00 | 1.00 | 1.00 | 1.00 | 1.00 |
| Triethylene glycol mono-n-butyl ether | 3.00 | 3.00 | 3.00 | 3.00 | 3.00 | 3.00 | 3.00 |
| 2-Pyrrolidone | 2.00 | 2.00 | 2.00 | 2.00 | 2.00 | 2.00 | 2.00 |
| Olfine E1010*1 | 0.50 | 0.50 | 0.50 | 0.50 | 0.50 | 0.50 | 0.50 |
| Olfine STG*1 | 0.50 | 0.50 | 0.50 | 0.50 | 0.50 | 0.50 | 0.50 |
| Triethanolamine | 1.00 | 1.00 | 1.00 | 1.00 | 1.00 | 1.00 | 1.00 |
| Water | 42.30 | 42.30 | 37.30 | 37.30 | 37.30 | 37.30 | 37.30 |
| Total | 100 | 100 | 100 | 100 | 100 | 100 | 100 |

*1manufactured by Nissin Chemical Industry Co., Ltd.

Evaluation Items and Evaluation Method

Glossho

Printing was carried out with an ink jet printer PX-A550 (manufactured by Seiko Epson Corporation). Each of the ink compositions of Examples and Comparative Examples was loaded into a specialty cartridge for a yellow ink (model number ICY 31, manufactured by Seiko Epson Corporation) for this printer. Gradational blotted images are printed at a resolution of 1440 dpi on PM photographic paper (tradename; model number KA 420 PSK, manufactured by Seiko Epson Corporation) to provide printed matter. The printed matter thus obtained was allowed to stand at room temperature for one day, and 20-degree gloss of the maximum density part was measured with a gloss meter GM-268 (manufactured by KONICA MINOLTA). The results were evaluated according to the following criteria.

A: A 20-degree gloss of not less than 50

B: A 20-degree gloss of not less than 40 and less than 50

C: A 20-degree gloss of less than 40

The results were as shown in Table 5 below.

Fixation

Onto the recorded matter obtained above was put the backside of the same paper. A weight of 200 g/A4 was placed on the assembly, and the printed face was rubbed 20 times. The recorded matter was evaluated according to the following criteria.

A: No trace of rubbing was observed.

B: Traces of rubbing on a substantially unnoticeable level were observed.

C: Noticeable traces of rubbing were observed.

The results were as shown in Table 5 below.

Storage Stability of Ink

The ink compositions (50 g) were placed in aluminum bags. The bags were allowed to stand under an environment of 70° C. for one week. After the standing, each ink composition was inspected for the presence of foreign matter (sediment). The ink composition free from the presence of foreign matter was further inspected for a change in properties (viscosity, surface tension, pH, and particle diameter of resin particles). The results were evaluated according to the following criteria.

A: There was neither foreign matter nor a change in properties.

B: There was a slight change in properties, although no foreign matter occurred.

C: There was foreign matter or a significant change in properties.

The results were as shown in Table 5 below.

Recovery from Clogging

Printing was continuously carried out for 10 min using the above ink jet printer and cartridge. After normal ejection of the ink through all nozzles was confirmed, in order to accelerate drying in nozzles, the ink cartridge was removed, and the recording head was removed from the head cap, followed by standing in this state under an environment of 40° C. and 20% RH for one week. After the one-week standing, cleaning operation was repeated to determine the number of cleaning operations required for all the nozzles to normally eject the ink as in the initial state. The recovery from nozzle clogging was evaluated based on the number of cleaning operations according to the following criteria.

A: Recovered to the initial state by performing the cleaning operation once or twice.

B: Recovered to the initial state by performing the cleaning operation three or four times.

C: Recovered to the initial state by performing the cleaning operation four or five times.

D: Not recovered by repeating the cleaning operation by a practically considerable number of times.

The results were as shown in Table 5 below.

Continuous Printing Stability (1)

Blotted images and line patterns were continuously printed at room temperature using the above cartridge and ink jet printer. The number of times of cleaning of printer nozzles conducted as operation for recovery to normal printing upon the occurrence of ink dot dropouts or ink droplet trajectory directionality problem in printing on 100 sheets of paper was counted. The results were evaluated according to the following criteria.

A: No cleaning

B: Cleaning of once or twice

C: Cleaning of three or four times
D: Cleaning of five times or more
The results were as shown in Table 5 below.
Continuous Printing Stability (2)

Blotted images and line patterns were continuously printed using the above cartridge and ink jet printer under an environment of 40° C. and 20% RH. The number of times of cleaning of printer nozzles conducted as operation for recovery to normal printing upon the occurrence of ink dot dropouts or ink droplet trajectory directionality problem in printing on 100 sheets of paper was counted. The results were evaluated according to the following criteria.
A: No cleaning
B: Cleaning of once or twice
C: Cleaning of three or four times
D: Cleaning of five times or more
The results were as shown in Table 5 below.

(Example 10) is superior in continuous printing stability even under a high-temperature and low-humidity environment to the water-based ink using monomer composition B comprising less than 5 parts by weight of a monomer containing two or more polymerizable double bonds in one molecule (Example 7).

The water-based inks of Comparative Examples 1 and 2 are poor in fixation due to the absence of polymer particles B.

For the water-based ink of Comparative Example 3, since monomer composition A for constituting water insoluble vinyl polymer A does not contain a polyoxyalkylene group-containing monomer [1], the ink storage stability, recovery from clogging, and continuous printing stability are poor.

For the water-based ink of Comparative Example 4, since monomer composition B for constituting water insoluble

TABLE 5

|  | Gloss | Fixation | Ink storage stability | Recovery from clogging | Continuous printing stability (1) | Continuous printing stability (2) |
| --- | --- | --- | --- | --- | --- | --- |
| Example 1 | A | A | B | B | C | C |
| Example 2 | A | A | B | B | C | C |
| Example 3 | A | B | B | A | C | C |
| Example 4 | B | A | B | C | C | C |
| Example 5 | A | A | B | C | C | C |
| Example 6 | A | A | B | A | C | C |
| Example 7 | A | A | B | A | B | C |
| Example 8 | A | A | B | A | B | C |
| Example 9 | A | A | A | A | A | B |
| Example 10 | A | A | A | A | A | A |
| Example 11 | A | A | B | B | A | A |
| Example 12 | B | A | A | C | A | A |
| Comparative Example 1 | A | C | A | A | A | A |
| Comparative Example 2 | A | C | A | A | A | A |
| Comparative Example 3 | A | A | C | D | D | D |
| Comparative Example 4 | A | A | C | D | D | D |
| Comparative Example 5 | C | A | A | A | A | B |
| Comparative Example 6 | A | A | C | D | A | B |
| Comparative Example 7 | A | A | C | D | D | D |

As is apparent from the results shown in Table 5, for water-based inks using monomer composition B for constituting water insoluble vinyl polymer B, a water-based ink using 3 to 8 parts by weight of the monomer (unsaturated carboxylic acid) [5] copolymerizable with a styrene monomer (Example 6) is superior in recovery from clogging to the water-based inks of Example 1, Example 2 and Example 5.

Further, for water-based inks using monomer composition B for constituting water insoluble vinyl polymer B, the water-based inks using a monomer [5] containing two or more polymerizable double bonds in one molecule (Examples 7, 8 and 9) are superior in continuous printing stability to the water-based ink of Example 6.

Further, for the water-based ink of Example 9, since monomer composition B for constituting water insoluble vinyl polymer B contains an unsaturated amide compound [5], the ink storage stability and the continuous printing stability are superior to those of the water-based ink of Example 8.

The water-based ink using monomer composition B comprising 5 to 10 parts by weight of a monomer [5] containing two or more polymerizable double bonds in one molecule vinyl polymer B does not contain a styrene monomer [4], the ink storage stability, recovery from clogging, and continuous printing stability are poor.

For the water-based ink of Comparative Example 5, since the average particle diameter of polymer particles B exceeds 60 nm, the gloss of printed matter is poor.

For the water-based ink of Comparative Example 6, since the minimum film forming temperature of the polymer produced by polymerizing monomer composition B is below 20° C., the ink storage stability and recovery from clogging are poor.

For the water-based ink of Comparative Example 7, the ink storage stability, recovery from clogging, and continuous printing stability are poor, because monomer composition A for constituting water insoluble vinyl polymer A does not contain a polyoxyalkylene group-containing monomer [1] although monomer composition B for constituting water insoluble vinyl polymer B contains a monomer [5] containing two or more polymerizable double bonds in one molecule.

What is claimed is:

1. A water-based ink comprising a water dispersion of polymer particles including at least polymer particles A of a yellow pigment-containing water insoluble vinyl polymer A and polymer particles B of a pigment-free water insoluble vinyl polymer B, wherein
   the water insoluble vinyl polymer A is a polymer produced by polymerizing a monomer composition A containing
   [1] a polyoxyalkylene group-containing monomer,
   [2] a salt forming group-containing monomer, and
   [3] a monomer copolymerizable with the polyoxyalkylene group-containing monomer and the salt forming group-containing monomer,
   the water insoluble vinyl polymer B is a polymer produced by polymerizing a monomer composition B containing
   [4] a styrene monomer and
   [5] a plurality of monomers copolymerizable with the styrene monomer, and
   has a minimum film forming temperature of 20° C. or above, wherein
   the polymer particles B have an average particle diameter of 30 to 60 nm, and wherein the plurality of monomers copolymerizable with the styrene monomer comprise a (meth)acrylic ester, an unsaturated amide compound, a monomer having two or more polymerizable double bonds in one molecule and an unsaturated carboxylic acid.

2. The water-based ink according to claim 1, wherein the content of the unsaturated carboxylic acid is 3 to 8 parts by weight based on 100 parts by weight of the monomer composition B.

3. The water-based ink according to claim 1, wherein the content of the monomer having two or more polymerizable double bonds in one molecule is 5 to 10 parts by weight based on 100 parts by weight of the monomer composition B.

4. A water-based ink comprising a water dispersion of polymer particles including at least polymer particles A of a yellow pigment-containing water insoluble vinyl polymer A and polymer particles B of a pigment-free water insoluble vinyl polymer B, wherein the water insoluble vinyl polymer A is a polymer produced by polymerizing a monomer composition A containing
   [1] a polyoxyalkylene group-containing monomer,
   [2] a salt forming group-containing monomer, and
   [3] a monomer copolymerizable with the polyoxyalkylene group-containing monomer and the salt forming group-containing monomer,
   the water insoluble vinyl polymer B is a polymer produced by polymerizing a monomer composition B containing
   [4] a styrene monomer and
   [5] a plurality of monomers copolymerizable with the styrene monomer, and has a minimum film forming temperature of 20° C. or above, and
   the polymer particles B have an average particle diameter of 30 to 60 nm, wherein the polymer particles A are present in the water-based ink in an amount effective to enhance storage stability of the water-based ink, to improve recovery from clogging of a nozzle through with the water-based ink is ejected and/or to improve stability of printing with the water based ink as compared with the water-based ink without the polymer particles A, wherein the polymer particles B are present in the water-based ink in an amount effective to improve fixation of the water-based ink on gloss paper as compared with the water-based ink without the polymer particles B, and wherein the plurality of monomers copolymerizable with the styrene monomer comprise a (meth)acrylic ester, an unsaturated amide compound, a monomer having two or more polymerizable double bonds in one molecule and an unsaturated carboxylic acid.

5. The water-based ink according to claim 4, wherein the content of the unsaturated carboxylic acid is 3 to 8 parts by weight based on 100 parts by weight of the monomer composition B.

6. The water-based ink according to claim 4, wherein the content of the monomer having two or more polymerizable double bonds in one molecule is 5 to 10 parts by weight based on 100 parts by weight of the monomer composition B.

7. A water-based ink comprising a water dispersion of polymer particles including at least polymer particles A of a yellow pigment-containing water insoluble vinyl polymer A and polymer particles B of a pigment-free water insoluble vinyl polymer B, wherein the water insoluble vinyl polymer A is a polymer produced by polymerizing a monomer composition A containing
   [1] a polyoxyalkylene group-containing monomer,
   [2] a salt forming group-containing monomer, and
   [3] a monomer copolymerizable with the polyoxyalkylene group-containing monomer and the salt forming group-containing monomer,
   the water insoluble vinyl polymer B is a polymer produced by polymerizing a monomer composition B containing
   [4] a styrene monomer and
   [5] a plurality of monomers copolymerizable with the styrene monomer, and has a minimum film forming temperature of 20° C. or above, wherein the plurality of monomers copolymerizable with the styrene monomer comprise a (meth)acrylic ester, an unsaturated amide compound, a monomer having two or more polymerizable double bonds in one molecule and an unsaturated carboxylic acid;
   wherein the polymer particles B have an average diameter of 30 to 60 nm, wherein the polymer particles A are present in the water-based ink in an amount effective to enhance storage stability of the water-based ink, to improve recovery from clogging of a nozzle through with the water-based ink is ejected and/or to improve stability of printing with the water based ink as compared with the water-based ink without the polymer particles A, and wherein the polymer particles B are present in the water-based ink in an amount effective to improve fixation of the water-based ink on gloss paper as compared with the water-based ink without the polymer particles B and to improve stability of printing as compared with the water-based ink with polymer particles B that do not comprise all of the plurality of monomers.

8. The water-based ink according to claim 7, wherein the content of the unsaturated carboxylic acid is 3 to 8 parts by weight based on 100 parts by weight of the monomer composition B.

9. The water-based ink according to claim 7, wherein the content of the monomer having two or more polymerizable double bonds in one molecule is 5 to 10 parts by weight based on 100 parts by weight of the monomer composition B.

* * * * *